United States Patent [19]
Frelier

[11] Patent Number: 5,937,123
[45] Date of Patent: Aug. 10, 1999

[54] FIBER OPTICAL LASER COLLIMATING DEVICE

[75] Inventor: Calvin A. Frelier, Penfield, N.Y.

[73] Assignee: Eastman Kodak Company, Rochester, N.Y.

[21] Appl. No.: 09/064,404

[22] Filed: Apr. 22, 1998

[51] Int. Cl.[6] ....................................................... G02B 6/36
[52] U.S. Cl. .............................. 385/79; 385/74; 385/75; 385/60; 385/134
[58] Field of Search ................................. 385/79, 82, 60, 385/61, 64, 73–75, 134, 136, 139, 33, 52

[56] References Cited

U.S. PATENT DOCUMENTS

| | | | |
|---|---|---|---|
| 4,303,301 | 12/1981 | Teichert et al. | 385/95 |
| 5,095,517 | 3/1992 | Monguzzi et al. | 385/90 |
| 5,374,768 | 12/1994 | Kim et al. | 385/52 |
| 5,418,872 | 5/1995 | Osaka et al. | 385/53 |

Primary Examiner—Hemang Sanghavi
Attorney, Agent, or Firm—Thomas H. Close

[57] ABSTRACT

A optical fiber alignment device with a collimating lens, includes a ferrule for receiving the optical fiber; a ball having an axial hole for receiving the ferrule; a housing having a socket in one end for receiving the ball; and a lens barrel in the opposite end for receiving a lens sleeve. A compression ring for urging the ball into the socket is forced by a first spring located to apply a compression force to the compression ring by an end cap. A channel in the housing allows for the introduction of a bonding agent to bond the ball in the socket to maintain a desired position after adjustment. A lens fixed in a lens sleeve is located in the lens tube at a position to collimate light exiting from the optical fiber. A second spring located between the lens sleeve and the lens barrel urges the lens sleeve out of the barrel and a channel in the housing is provided for introducing a bonding agent to bond the lens sleeve in the lens barrel to maintain the desired position.

10 Claims, 7 Drawing Sheets

FIBER OPTICAL LASER COLLIMATING DEVICE

This invention was made with Government support under contract number AX00022E6S for the Department of Defense. The Government has certain rights in this invention.

FIELD OF THE INVENTION

The invention relates to a device for aligning a fiber optic with other optical components in an optical assembly.

BACKGROUND OF THE INVENTION

Fiber optic laser collimating devices need to be lightweight, mechanically stable, rugged, precise, easily alignable and compact. For example U.S. Pat. No. 4,303,301, issued Dec. 1, 1981, to Teichert et al. shows a fiber optic coupling device wherein a fiber optic is placed in a ferrule, the ferrule is located in a hole in a spherical element and the sphere is held against a spherical socket in a housing by a screw plug. The angular position of the ferrule is adjusted with the sphere held loosely in the socket and then the screw plug is tightened to secure the sphere in the socket. The linear position of the fiber optic is adjusted by sliding the ferrule in or out of the ball, to a desired location, and then potting the ferrule with adhesive. Although suitable for fiber optic applications where the adjustment tolerances are not critical, it falls short of a commercially viable solution when the adjustment of the fiber optic requires micron precision. There is a need therefore for an improved fiber optic alignment device.

SUMMARY OF THE INVENTION

A optical fiber alignment device with a collimating lens, includes a ferrule for receiving the optical fiber; a ball having an axial hole for receiving the ferrule; a housing having a socket in one end for receiving the ball; and a lens barrel in the opposite end for receiving a lens sleeve. A compression ring for urging the ball into the socket is forced by. a first spring located to apply a compression force to the compression ring by an end cap. A channel in the housing allows for the introduction of a bonding agent to bond the ball in the socket to maintain a desired position after adjustment. A lens fixed in a lens sleeve is located in the lens tube at a position to collimate light exiting from the optical fiber. A second spring located between the lens sleeve and the lens barrel urges the lens sleeve out of the barrel and a channel in the housing is provided for introducing a bonding agent to bond the lens sleeve in the lens barrel to maintain the desired position.

DETAILED DESCRIPTION OF THE INVENTION

Figure 1:
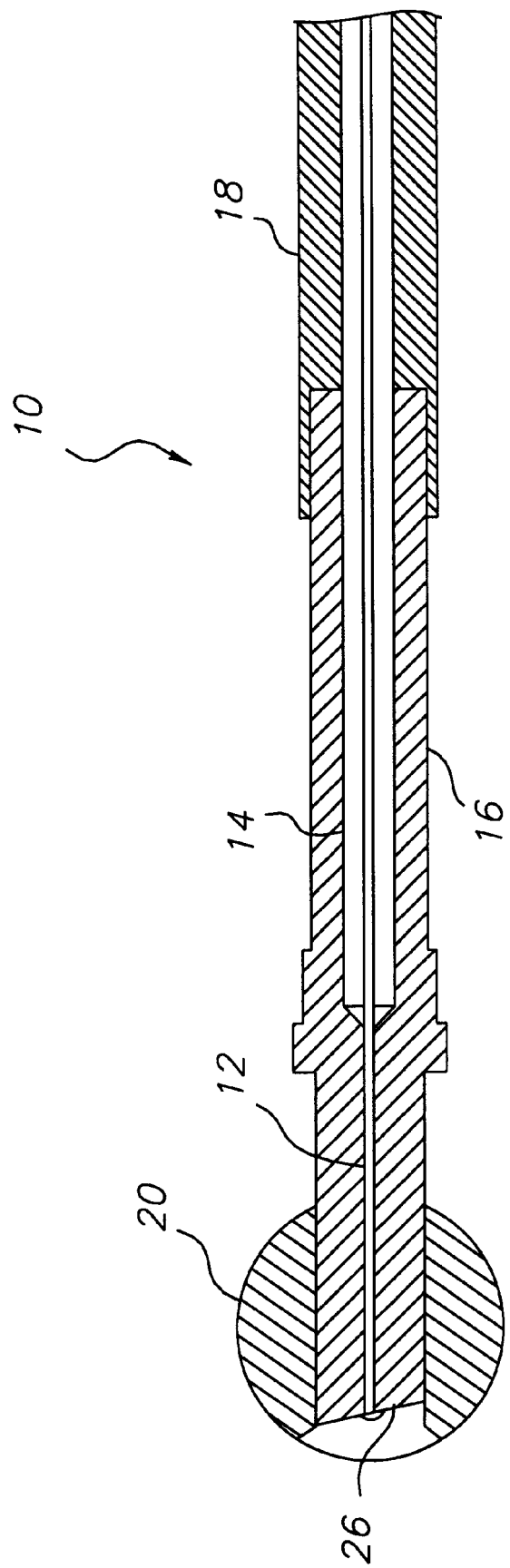
FIG. 1 is a cross sectional view of an optical fiber encased in a ceramic ferrule bonded into a spherical ball.
Figure 2:
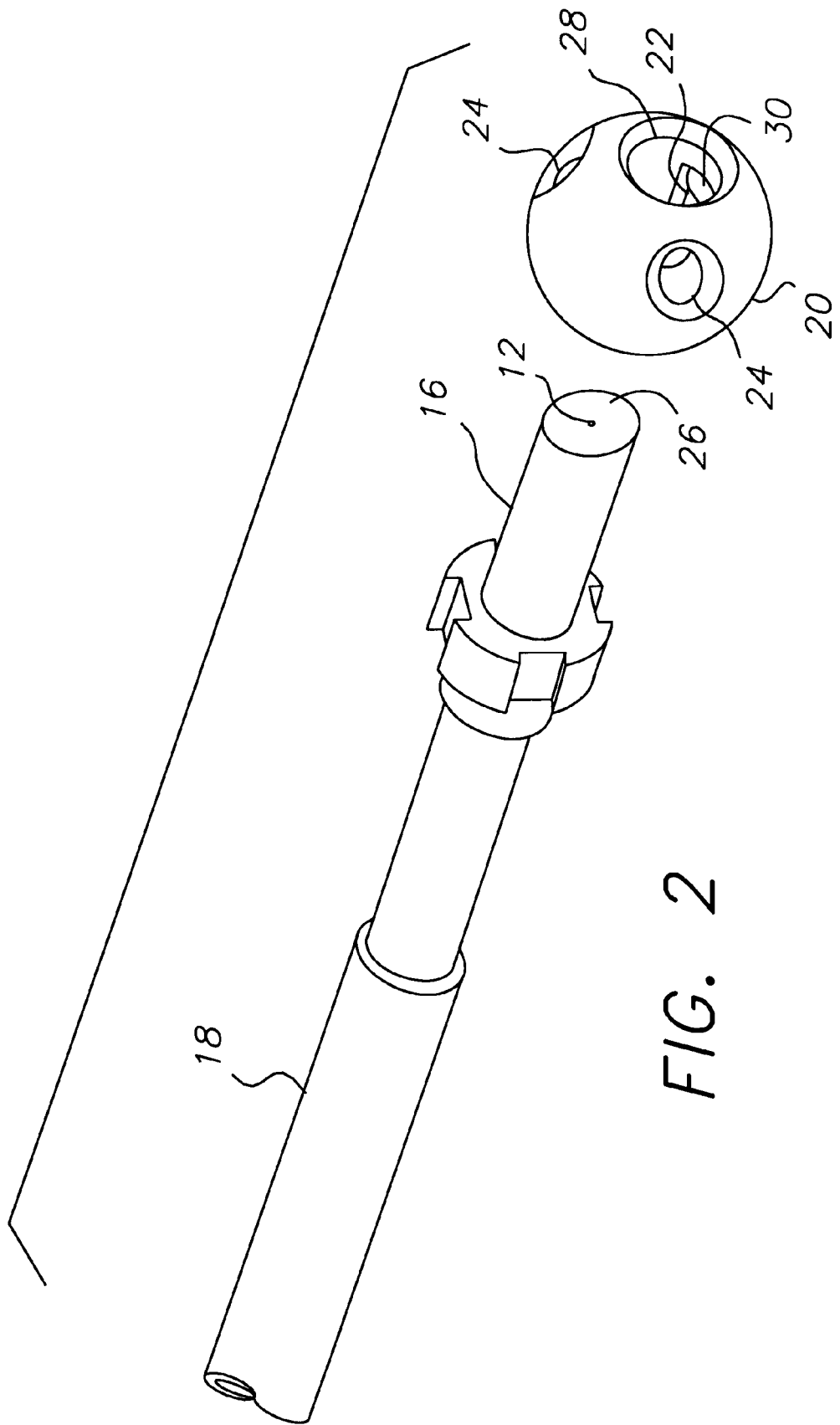
FIG. 2 is an exploded perspective of the ferrule and ball assembly shown in FIG. 1.

Referring to FIG. 1, a cross-sectional view of a fiber optic assembly 10 employed in the present invention is shown. The fiber optic 12 is encased over most of its length in a buffer material 14. One end of the fiber optic 12 is held in a ferrule 16. The ferrule is approximately ¾ inch long by ⅛ inch in diameter. The fiber optic in the ferrule is available from Wave Optics Inc., Mountain View, Calif.. On the other end, and over most of its length, the optical fiber 12 is encased in a sheath 18. One end of the ferrule 16 is bonded into a stainless steel ball 20 by injecting a potting agent (such as Hysol EA9313 epoxy available from Norland Products Inc., North Brunswick, N.J.) into gaps between the ball 20 and the ferrule 16. The ball 20 is approximately ¼ inch in diameter. As shown in FIG. 2, the ball 20 is designed with small grooves 22 that run from potting agent introduction holes 24 in a direction away from the light emitting face 26 of the optical fiber 12. The groves 22 run a partial length of the bore 28 with a dam 30 on the end nearest the light emitting face 26 of the fiber optic 12. The dams 30 are provided to prevent potting compound from leaking onto the light emitting face 26. The bore 28 of the ball 20 is tightly matched to the outer diameter of the ferrule 16 to act as a positional control on the fiber optic 12 with respect to the center of the ball 20.

Figure 3:
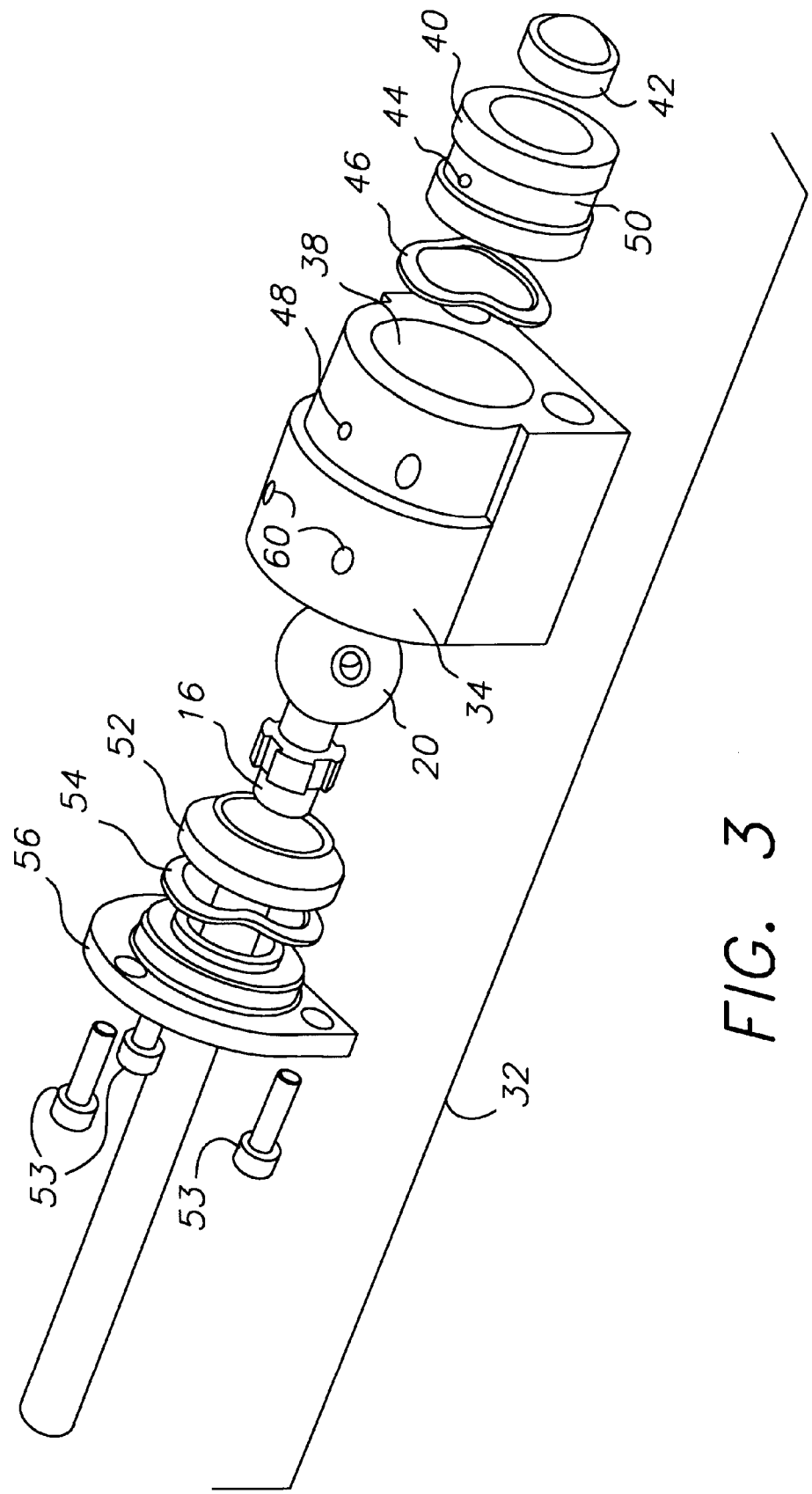
FIG. 3 is an exploded perspective view of the fiber optic laser collimating device according to the present invention.
Figure 4:
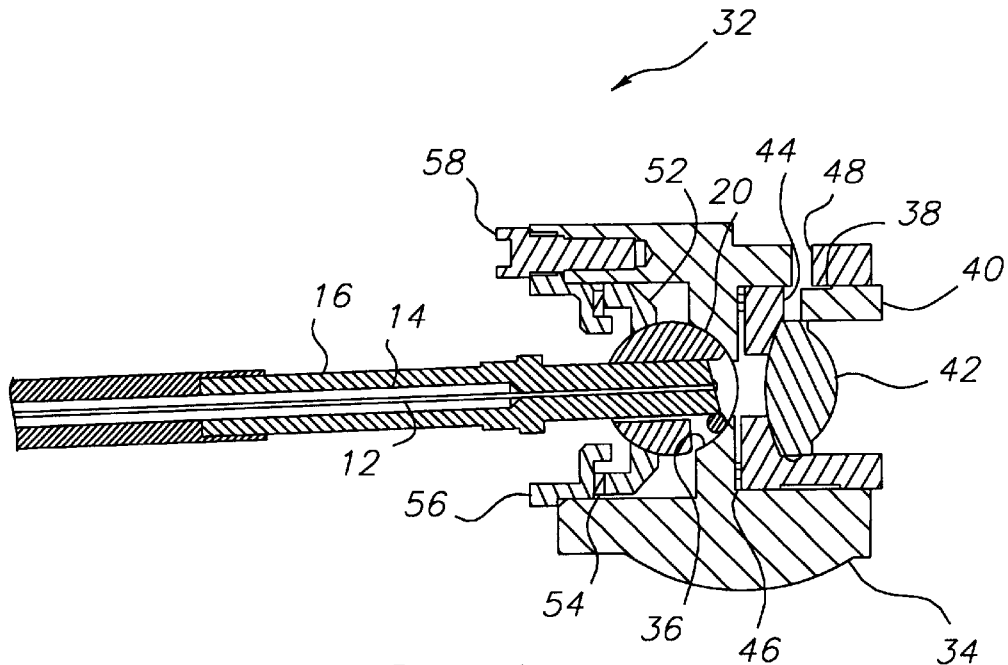
FIG. 4 is a cross-sectional view of the fiber optic laser collimating device.

Referring now to FIGS. 3 and 4, the fiber optic laser collimating device 32 according to one aspect of the present invention is shown. The collimating device 32 includes a housing 34 machined from titanium. The housing is approximately ½ inch square. The housing 34 has a socket 36 in one end for receiving the ball 20, and a lens barrel 38 in the opposite end for receiving a lens sleeve 40. The lens barrel 38 and lens sleeve 40 are machined to match fit. A collimating lens 42 is fixed in the lens sleeve 40 by introducing potting agent through holes 44. The lens sleeve 40 with the collimating lens 42 is then located in lens barrel 38 to collimate the uncollimated light emitted from the end of optical fiber 12. The sleeve 40 can be moved axially in the lens barrel 38 to adjust focus. The sleeve 40 is urged into the lens barrel 38 against a wave spring 46 which provides a return force to the sleeve 40 during the positioning of lens 42 with respect to the end of fiber optic 12. When it has been determined that lens 42 is in the correct position, lens sleeve 40 is bonded in the lens barrel 38 by injecting potting agent into a hole 48 in housing 34. Lens sleeve 40 is provided with a channel 50 of reduced diameter to allow the potting agent to flow completely around the lens sleeve 40. Centering of the coupling lens in the x and y coordinates, with respect to the fiber optic is controlled by tight positional tolerances on the components. The choice of the coupling lens optical prescription allows this approach to work without the need for separate x and y positional adjustments.

During assembly, the ball 20 is urged against socket 36 by a compression ring 52, a wave spring 54, and an end cap 56. End cap 56 is held onto housing 34 by fasteners 58 to provide a predictable force to hold the ball 20 in its seat and allow adjustment when the fasteners 58 are partially tightened and wave spring 54 is partially compressed. During assembly, ball 20 can be swiveled and rotated in the housing to align the fiber optic to the desired position. When the desired position is achieved, the fasteners 58 are fully tightened to lock ball 20 in place and then potting agent is introduced into holes 60. The potting agent fills the void between the ball 20 and the compression ring 52.

Figure 5:
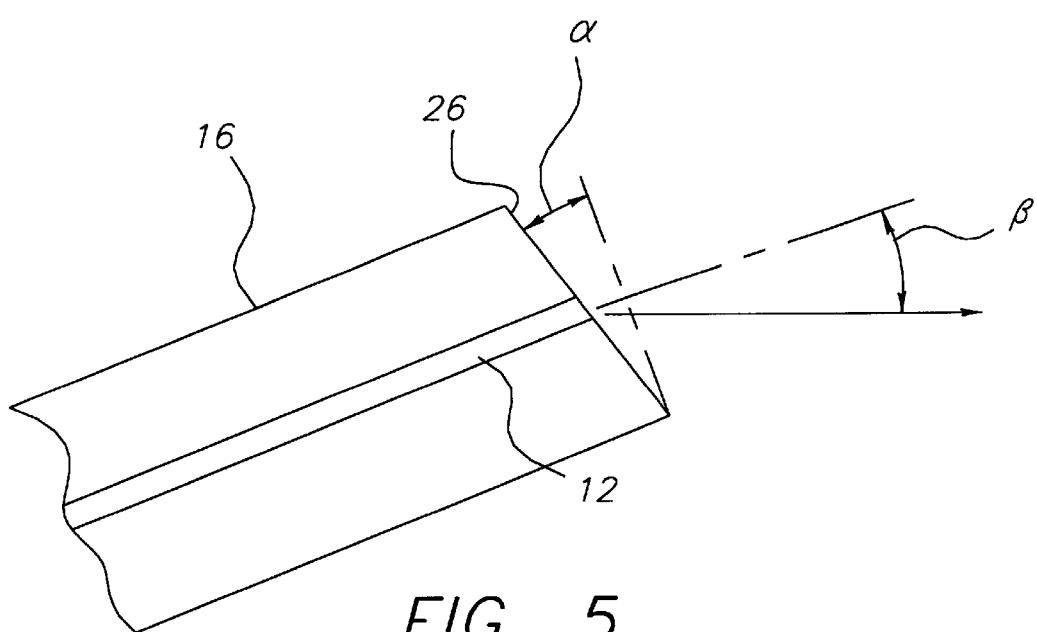
FIG. 5 is a schematic view illustrating the end of the ferrule holding the fiber optic.

As shown in FIGS. 4 and 5, the light emitting face 26 of the optical fiber 12 is formed at an angle α of about 8° with respect to a plane perpendicular to the fiber axis. The beam emitted from this face is thereby diffracted at an angle β of about 3.58° from a line parallel to the axis of the fiber to the polished end surface of the fiber. The fiber optic is mounted in the housing 34 at an equivalent angle of 3.58° so that the beam that emerges from the end of the fiber is parallel to the axis of lens 42. This arrangement results in reduced back reflection from the end surface 26 of the fiber optic 12, thereby preventing the destabilization of a laser (not shown) at the other end of the fiber optic 12.

Figure 6:
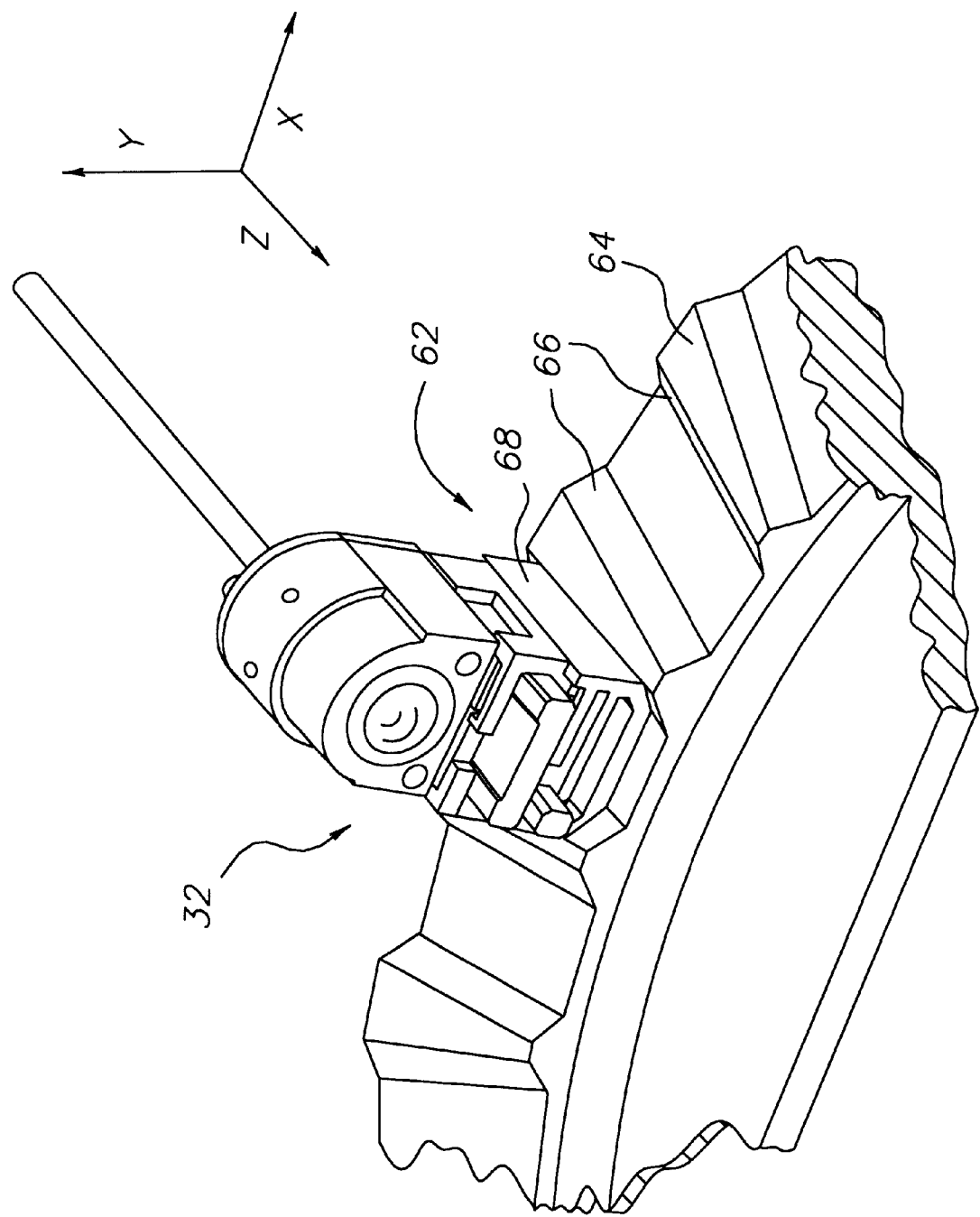
FIG. 6 is a perspective view of the fiber optic laser collimating device positioned on a translational stage.

Referring to FIG. 6, according to another aspect of the invention, the fiber optic laser collimating device 32 is carried on a translational stage 62 for providing adjustment in the X, Y, Z, $\theta_x$ and $\theta_y$ directions. The coordinate system assumed is a right handed orthogonal coordinate system with the coordinate Z lying parallel to the optical axis of lens 42, pointing toward the lens and originating at the optical fiber end. The Y coordinate originates at the fiber end and points up in the direction of the rounded upper surface of the lens barrel. The translational stage 62 includes a platform 64 having flat-bottomed V-shaped grooves 66. The platform 64 shown in FIG. 6 can accommodate several fiber optic laser collimating devices, only one of which is shown. A delta-Z-mount 68 having a bottom shape complementary to the v-shaped groove 66 rests in one of the v-shaped grooves, and is slidable therein to provide adjustment of the translational stage in the Z direction. A small gap is provided between the delta-Z mount 68 and the platform 64 to allow for insertion of potting agent to fix the position of the Z-mount after adjustment.

Figure 7:
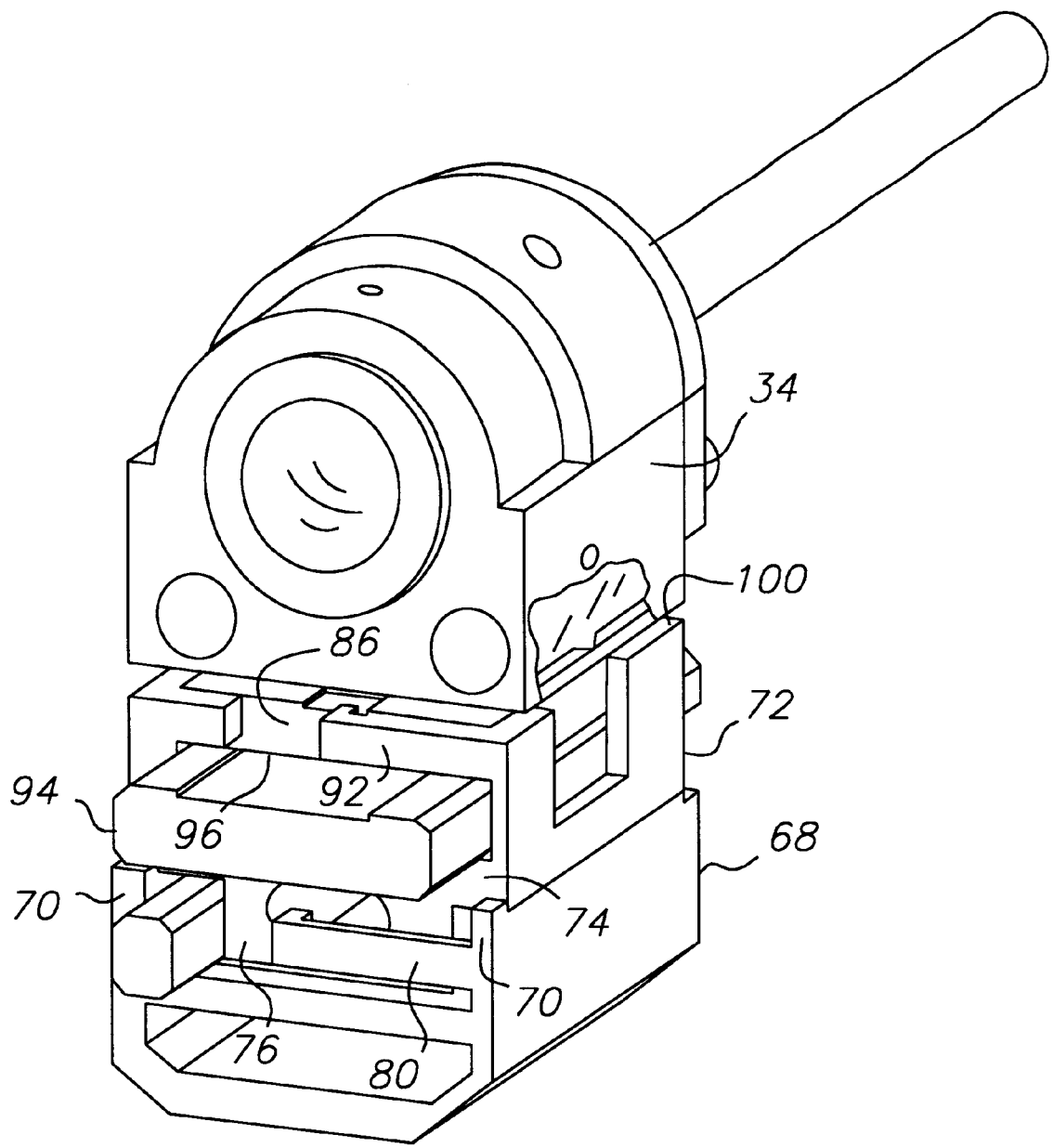
FIG. 7 is a more detailed perspective view of the fiber optic laser collimating device positioned on the translational stage.
Figure 8:
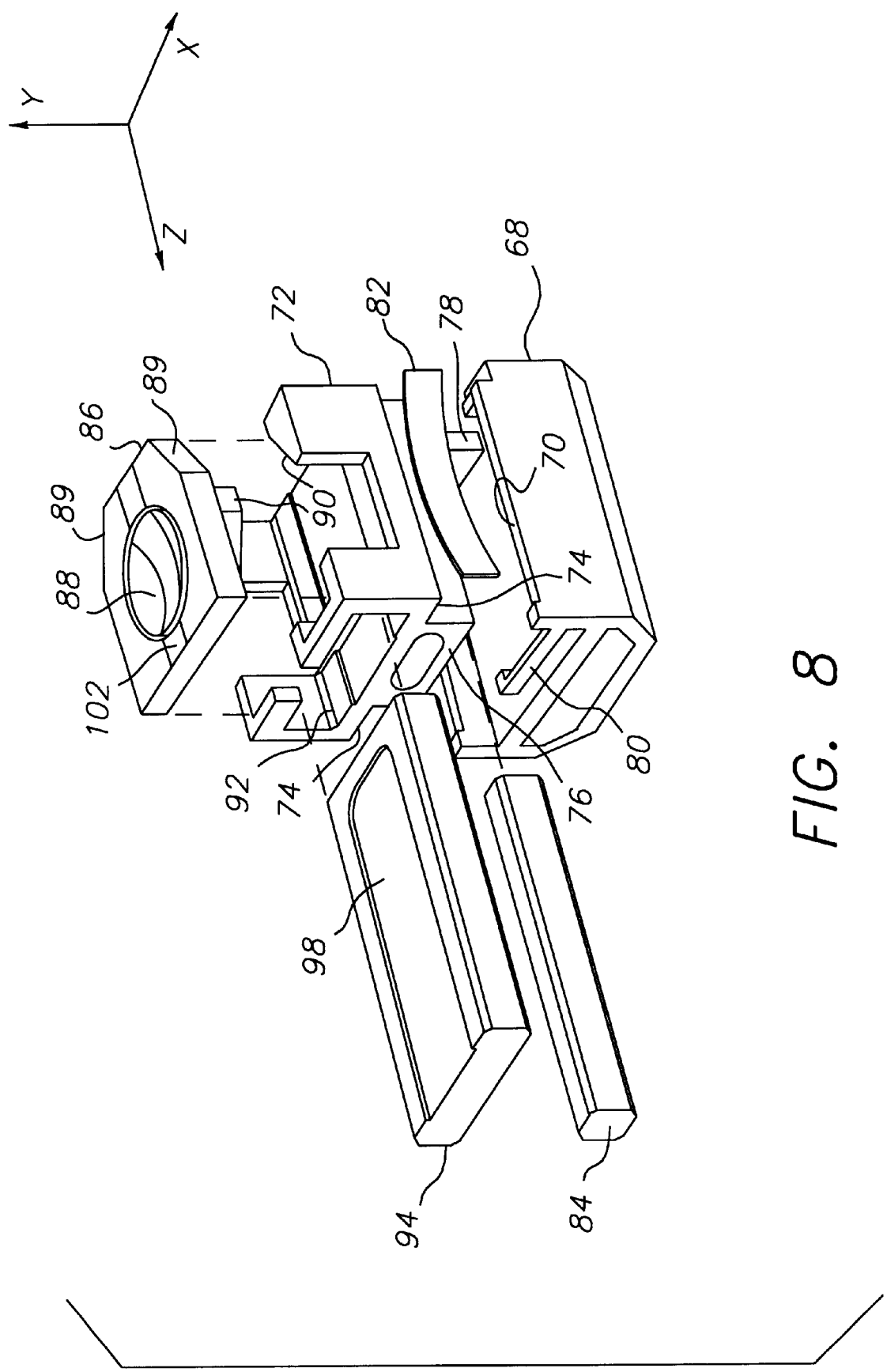
FIG. 8 is an exploded perspective view of the translational stage sub assembly.

Referring now to FIGS. 7 and 8, the delta-Z mount 68 defines a pair of spaced apart walls 70 extending in the Z direction. A delta-X mount 72 defines a pair of shoulders 74 that rest on the spaced apart walls 70 of the delta-Z mount 68. The delta-X mount 72 has a center portion 76 that extends down between the spaced apart walls 70. The delta-X mount is urged into a stop 78 on the back of the delta-Z mount by an integral spring finger 80, but is free to slide back and forth in the X direction. A leaf spring 82 located between one side wall 70, and the center portion 76 urges the delta-X mount in the negative X direction. A first wedge 84 is positioned between the center portion 76 and the opposite wall 70. The side of the center portion 76 that contacts the first wedge 84 has a complementary taper, so that the first wedge contacts the center portion along its entire length. First wedge 84 is displaced in the Z direction to adjust the delta-X mount in the X direction. When the desired position is achieved, a potting agent is introduced into a gap between the bottom of the center portion 76 and the top of the delta-Z mount 68.

A wedge-shaped delta-Y support plate 86, having a spherical seat 88 is positioned in the top of delta-X mount 72. The wedge of support plate 86 tapers in thickness the Z direction, and includes a v-shaped feature 89 on one end. The v-shaped feature of the support plate 86 is urged into stops 90 in the delta-X mount by spring finger 92. The delta-Y support plate 86 is free to move up and down with respect to the delta-X mount in the Y direction. A second wedge 94 located between the top of the delta-X mount 72 and the bottom of the delta-Y support plate 86 can be moved in the Z direction to displace the delta-Y support plate in the Z direction. Driving the second wedge causes the pivot plate to ride up or down the slope as the case may be. The interface between the wedge and the wall is not sloped so no vertical translation occurs at that interface. When the desired position is achieved, a potting agent is introduced into a gap 96 between the bottom of the support plate 86 and the top of the delta-X mount 72. A reservoir 98 is provided in second wedge 94 to allow for effective flow of the potting agent. An external force is used to bias the delta-Y support plate 86 against the wedge 94 during adjustment.

Preferably, all potting surfaces are placed along a central axis of the translational mount and all load bearing surfaces are peripheral. This is done to increase structural and thermal stability as the potting agent tends to shrink with curing. Hence a better stress distribution is achieved with this preferred arrangement.

Referring back to FIG. 4, the bottom of housing 34 is provided with a spherical feature that is complementary to the spherical depression in the delta-Y support plate 86. The housing 34 is placed on the support plate 86 and is free to rotate in the $\theta_x$ and $\theta_y$ directions during alignment. Small tabs 100 on the underside of housing 34 rest on the face of the delta-Y support plate 86 to prevent it from rolling about the optical axis ($\theta_z$ direction). When the desired alignment is achieved, potting agent is introduced between the housing 34 and the delta-Y support plate 86. A groove 102 is provided in the support plate to facilitate flow of the potting agent.

The alignment device of the present invention is capable of aligning a fiber optic with a collimating lens and directing the collimated beam to a precision of 5 arc seconds.

A separate piece of equipment is required to hold the fiber optic coupling device, set the focus position of the coupling lens, and make the fine adjustments required to position the ferrule and ball assembly with respect to the coupling lens. This equipment is removed after the alignment and bonding process is complete. By providing the adjustments for all three degrees of translational motion on the Z axis of the translational stage, a plurality of the devices can be arranged in very close proximity to each other (e.g. within 1/10 of an inch) and independently adjusted without mutual interference.

The invention has been described in detail with particular reference to certain preferred embodiments thereof, but it will be understood that variations and modifications can be effected within the spirit and scope of the invention.

PARTS LIST

10 fiber optic assembly
12 fiber optic
14 buffer material
16 ferrule
18 sheath
20 stainless steel ball
22 grooves
24 potting agent induction holes
26 emitting face
28 bore
30 dam
32 fiber optic laser collimating device
34 housing
36 socket 38 lens barrel
40 lens sleeve
42 collimating lens
44 through holes
46 wave spring
48 hole in housing
50 channel
52 compression ring
54 wave spring
56 end cap
58 fasteners
60 holes
62 translational stage
64 platform
66 v-shaped grooves
68 delta-Z mount
70 spaced apart walls
72 delta-X mount
74 shoulders
76 center portion
78 stop
80 integral spring finger
82 leaf spring
84 first wedge
86 wedge shaped delta-Y support plate
88 spherical seat
89 v-shaped feature
90 stops
92 spring finger
94 second wedge
96 cap
98 reservoir
100 small tab
102 groove

What is claimed is:

1. A method of aligning an optical fiber with a collimating lens, comprising the steps of:
   a) locating the optical fiber in a ferrule;
   b) providing a ball having an axial hole for receiving the ferrule;
   c) fixing the ferrule in the axial hole in the ball;
   d) providing a housing having a socket in one end for receiving the ball and a lens barrel in the opposite end for receiving a lens sleeve;
   e) urging the ball into the socket with a compression ring and a first spring to apply a uniform controllable force urging the ball into the socket;
   f) adjusting the position of the ball in the socket to a desired position;
   g) bonding the ball in the socket to maintain the desired position;
   h) bonding the lens in the lens sleeve;
   i) urging the lens sleeve into the lens barrel against a second spring;
   j) locating the sleeve in the lens barrel, by forcing the sleeve against the spring, at a position to collimate light exiting from the optical fiber; and
   k) bonding the lens sleeve in the lens barrel to maintain the desired position.

2. The method claimed in claim 1, wherein the first and second springs are wave springs.

3. An optical fiber alignment device with a collimating lens, comprising:
   a) a ferrule for receiving the optical fiber;
   b) a ball having an axial hole for receiving the ferrule;
   c) a housing having a socket in one end for receiving the ball and a lens barrel in the opposite end for receiving a lens sleeve;
   d) a compression ring for urging the ball into the socket;
   e) a first spring located to apply a compression force to the compression ring;
   f) an end cap for compressing the first spring;
   g) a channel in the housing for introducing a bonding agent to bond the ball in the socket to maintain a desired position after adjustment;
   h) a lens located in the lens sleeve;
   i) the lens sleeve being located in the lens tube at a position to collimate light exiting from the optical fiber;
   j) a second spring located between the lens sleeve and the lens barrel, urging the lens sleeve out of the barrel; and
   k) a channel in the housing for introducing a bonding agent to bond the lens sleeve in the lens barrel to maintain the desired position.

4. The device claimed in claim 3, wherein the second spring is a wave spring.

5. The device claimed in claim 3, wherein the optical fiber and the ferule has an angled face whereby a light beam exits from the fiber at an angle to the axis of the fiber.

6. The device claimed in claim 3, further comprising a translational stage for adjusting the position of the housing in the X, Y, Z and θx, and θy directions, where the Z direction is parallel to the axis of the lens barrel.

7. The device claimed in claim 6, wherein the housing defines a spherical alignment feature and the translational stage comprises:
   a) a wedge shaped delta-Y support plate defining a spherical seat for receiving the spherical alignment feature of the housing for allowing the housing to rotate in the θx and θy directions;
   b) a platform defining a flat-bottomed, v-shaped groove in the Z direction;
   c) a delta Z mount having bottom shape complementary to the v-shaped groove, such that the mount is supported by the sides of the v-shaped groove, slightly above the flat bottom of the v-shaped groove, and defining on the top thereof, a pair of spaced apart walls extending in the Z direction;
   d) a delta X mount having a bottom shape defining a pair of shoulders adapted to rest on the spaced apart walls of the delta Z mount for movement of the delta X mount in the X direction, a protruding portion extending between the walls of the delta Z mount, one surface of the protruding portion defining a wedge shaped space between one wall of the delta Z mount and the protruding portion of the delta X mount, and further defining an alignment feature for receiving the support plate and restricting motion of the delta-Y support plate in the X and Z directions;
   e) a first wedge located in the wedge shaped space for moving the delta X mount in the X direction relative to the delta Z mount; and
   f) a second wedge located in the delta x mount under the delta-Y support plate for displacing the support plate in the Y direction relative to the delta X mount.

8. The device claimed in claim 7, further comprising means on the housing to prevent rotation of the housing with respect to the support plate in the $\theta_z$ direction.

9. An X, Y, Z translational stage comprising:
   a) a wedge shaped delta-Y support plate defining a seat for supporting an article to be translated;
   b) a platform defining a flat-bottomed, v-shaped groove in the Z direction;
   c) a delta Z mount having a bottom shape complementary to the v-shaped groove, such that the mount is supported by the sides of the v-shaped groove, slightly above the flat bottom of the v-shaped groove, and defining on the top thereof, a pair of spaced apart walls extending in the Z direction, the delta Z mount being slidable in the v-shaped groove to adjust the translational stage in the Z direction;
   d) a delta X mount having a bottom shape defining a pair of shoulders adapted to rest on the spaced apart walls of the delta Z mount for movement of the delta X mount in the X direction, a protruding portion extending between the walls of the delta Z mount, one surface of the protruding portion defining a wedge shaped space between one wall of the delta Z mount and the protruding portion of the delta X mount, and further defining an alignment feature for receiving the delta-Y support plate and restricting motion of the support plate in the X and Z directions;
   e) a first wedge located in the wedge shaped space for moving the delta X mount in the X direction relative to the delta Z mount by displacing the first wedge in the Z direction; and
   f) a second wedge located in the delta X mount under the delta-Y support plate for displacing the delta-Y support plate in the Y direction relative to the delta X mount by displacing the second wedge in the Z direction, whereby X, Y and Z displacements are affected by moving the first wedge, the second wedge, and the delta Z mount respectively in the Z directions, thereby providing an X. Y,. Z translational stage that is extremely compact.

10. The X, Y, Z translational stage claimed in claim 9, wherein the delta-Y support plate defines a spherical depression for supporting a complementarily shaped article.

* * * * *